US012671491B2

(12) United States Patent
Sanguanpuak et al.

(10) Patent No.: US 12,671,491 B2
(45) Date of Patent: Jun. 30, 2026

(54) TEMPORAL DOMAIN OVERLAPPED PREDICTION WITH UE MODEL MONITORING ENHANCEMENT

(71) Applicant: Nokia Technologies Oy, Espoo (FI)

(72) Inventors: Tachporn Sanguanpuak, Oulu (FI); Frederick Vook, Naperville, IL (US); Amir Mehdi Ahmadian Tehrani, Munich (DE); Andrea Bonfante, Massy (FR); Keeth Saliya Jayasinghe Laddu, Espoo (FI)

(73) Assignee: Nokia Technologies Oy, Espoo (FI)

( * ) Notice: Subject to any disclaimer, the term of this patent is extended or adjusted under 35 U.S.C. 154(b) by 0 days.

(21) Appl. No.: 18/765,761

(22) Filed: Jul. 8, 2024

(65) Prior Publication Data

US 2025/0047361 A1      Feb. 6, 2025

Related U.S. Application Data

(60) Provisional application No. 63/530,285, filed on Aug. 2, 2023.

(51) Int. Cl.
H04B 7/08 (2006.01)

(52) U.S. Cl.
CPC ................................... H04B 7/088 (2013.01)

(58) Field of Classification Search
CPC .............. H04B 7/0695; H04B 7/06952; H04B 7/06956; H04B 7/06958; H04B 7/0696;
(Continued)

(56) References Cited

U.S. PATENT DOCUMENTS 6,393,263 B1 * 5/2002 Hayashi ................. G04R 20/02
455/566
2014/0331102 A1 * 11/2014 Lee ................... H03M 13/2906
714/758

FOREIGN PATENT DOCUMENTS

WO     WO-2024030067 A1 *  2/2024   ......... H04B 7/06952
WO     WO-2024173223 A1 *  8/2024   ............... G06N 3/08
(Continued)

OTHER PUBLICATIONS

ZTE Corporation "Discussion on potential enhancements for AI/ML based beam management" R1-2203251, 3GPP TSG RAN WG1 Meeting #109-e Meeting, May 9-20, 2022. (Year: 2022).*
(Continued)

*Primary Examiner* — Sophia Vlahos
(74) *Attorney, Agent, or Firm* — Nokia Technologies Oy

(57) ABSTRACT
This document discloses a method and an apparatus to perform using a predicted sequence of beam measurement outputs for at least one observation window associated with at least one prediction window providing reference signal received power measurements to predict a beam prediction output; identifying that a prediction window of the at least one prediction window is overlapped with at least a portion of an observation window of the at least one observation window over a time period; and comparing the beam prediction output during the overlapped portion with measurements of the observation window during the overlapped portion to perform long term real time monitoring to determine at least one prediction output for use in a next time instant, wherein the determining is based on a predicted reference signal received power of the at least one prediction output being above a threshold.

20 Claims, 7 Drawing Sheets

(58) Field of Classification Search
CPC ............ H04B 7/06962; H04B 7/06964; H04B
7/0877; H04B 7/088; G06N 20/00; G06N
3/02; G06N 3/00; G06N 3/08; H04L
41/16
See application file for complete search history.

(56) References Cited

FOREIGN PATENT DOCUMENTS

| WO | WO-2024173821 A1 * | 8/2024 | ............. | G06N 20/00 |
| WO | WO-2024256902 A1 * | 12/2024 | ............. | H04W 24/02 |

OTHER PUBLICATIONS

Ericsson "Discussion on AI/ML for beam management" R1-2304750, 3GPP TSG-RAN WG1 Meeting #113, May 22-26, 2023. (Year : 2023).*

NTT DOCOMO, Inc, "Discussion on other aspects AI/ML for beam management" R1-2305594, 3GPP TSG RAN WG1 #113, May 22-May 26, 2023. (Year: 2023).*

"New SI: Study on Artificial Intelligence (AI)/Machine Learning (ML) for NR Air Interface", 3GPP TSG RAN Meeting #94e, RP-213599, Agenda: 8.6.1, Qualcomm, Dec. 6-17, 2021, 6 pages.

Finland Provisional Application No. 20235561, "Beam selection information", filed on May 17, 2023, pp. 1-38.

* cited by examiner

SSB #O

SSB #N

NZP-CSI-
RS #O...#K

MT-beam
i.d.3 bestRXbeam

MT

TX/RX beam
(index) O...K

Antenna configuration
1..N antennas in Y
panels

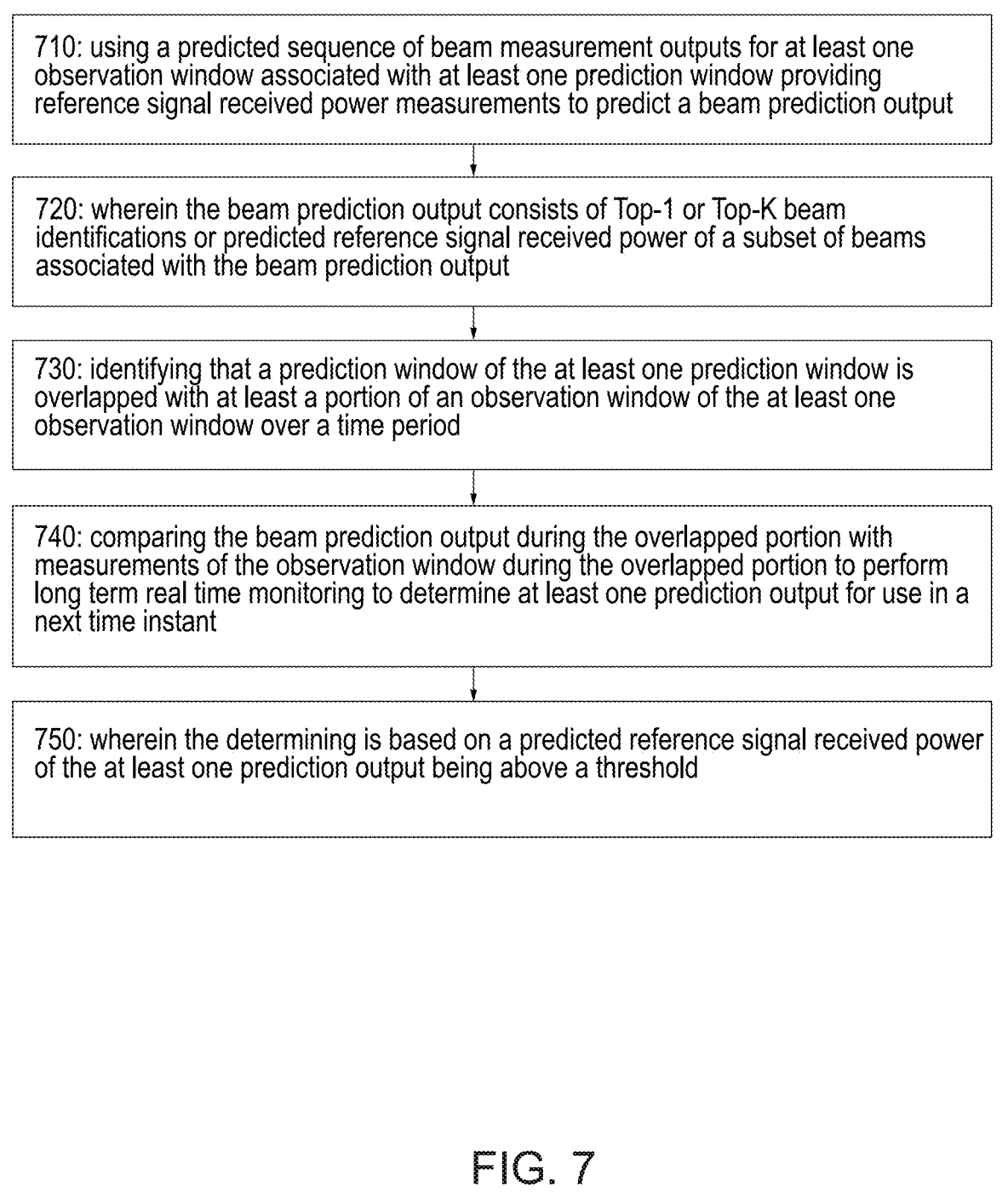

710: using a predicted sequence of beam measurement outputs for at least one observation window associated with at least one prediction window providing reference signal received power measurements to predict a beam prediction output 720: wherein the beam prediction output consists of Top-1 or Top-K beam identifications or predicted reference signal received power of a subset of beams associated with the beam prediction output 730: identifying that a prediction window of the at least one prediction window is overlapped with at least a portion of an observation window of the at least one observation window over a time period 740: comparing the beam prediction output during the overlapped portion with measurements of the observation window during the overlapped portion to perform long term real time monitoring to determine at least one prediction output for use in a next time instant 750: wherein the determining is based on a predicted reference signal received power of the at least one prediction output being above a threshold

FIG. 7

TEMPORAL DOMAIN OVERLAPPED PREDICTION WITH UE MODEL MONITORING ENHANCEMENT

TECHNICAL FIELD

The teachings in accordance with the exemplary embodiments of this invention relate generally to a new machine learning-dedicated bearer for machine learning or artificial intelligence related data exchange to produce a new user equipment sided-model with prediction quality indication and, more specifically, relate to a new machine learning-dedicated bearer for machine learning or artificial intelligence related data exchange to produce a new user equipment sided-model with prediction quality indication using overlapped sliding window prediction.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Certain abbreviations that may be found in the description and/or in the Figures are herewith defined as follows:
- 5G—5th Generation
- AI—Artificial Intelligence
- CSI—Channel State Information
- DL—Downlink
- gNB—5G/NR base station
- LSTM—Long-Short Term Memory
- ML—Machine Learning
- NR—New Radio
- NN—Neural Network
- RAN—Radio Access Network
- RS—Reference Signal
- Rx—Receiver
- SSB—Synchronization Signal Block
- TRP—Transmission Point
- Tx—Transmitter
- UE—User Equipment In many transmission systems, a beamforming transmission can be identified and adopted to provide higher beamforming gain and improved coverage. One process used by base station or a user equipment for beamforming is beam sweeping. In beam sweeping, beamforming directions are obtained by measuring signals in different beam directions. This process of beam sweeping includes processes such as performing signal quality measurement, performing beam selection, and sending quality indications and reference signals in different beam directions.

Example embodiments of this invention proposes improved operations for at least these operations as above.

SUMMARY

This section contains examples of possible implementations and is not meant to be limiting.

In another example aspect of the invention, there is an apparatus, such as a user equipment side or a network side apparatus, comprising: at least one processor; and at least one non-transitory memory storing instructions, that when executed by the at least one processor, cause the apparatus at least to: use a predicted sequence of beam measurement outputs for at least one observation window associated with at least one prediction window providing reference signal received power measurements to predict a beam prediction output, wherein the beam prediction output consists of Top-1 or Top-K beam identifications or predicted reference signal received power of a subset of beams associated with the beam prediction output; identify that a prediction window of the at least one prediction window is overlapped with at least a portion of an observation window of the at least one observation window over a time period; and compare the beam prediction output during the overlapped portion with measurements of the observation window during the overlapped portion to perform long term real time monitoring to determine at least one prediction output for use in a next time instant, wherein the determining is based on a predicted reference signal received power of the at least one prediction output being above a threshold.

In still another example aspect of the invention, there is a method, comprising: using a predicted sequence of beam measurement outputs for at least one observation window associated with at least one prediction window providing reference signal received power measurements to predict a beam prediction output, wherein the beam prediction output consists of Top-1 or Top-K beam identifications or predicted reference signal received power of a subset of beams associated with the beam prediction output; identifying that a prediction window of the at least one prediction window is overlapped with at least a portion of an observation window of the at least one observation window over a time period; and comparing the beam prediction output during the overlapped portion with measurements of the observation window during the overlapped portion to perform long term real time monitoring to determine at least one prediction output for use in a next time instant, wherein the determining is based on a predicted reference signal received power of the at least one prediction output being above a threshold.

A further example embodiment is an apparatus and a method comprising the apparatus and the method of the previous paragraphs, wherein the at least one observation window comprises at least one sliding observation window of identification reference signal received power, and wherein the at least one prediction window comprises at least one sliding prediction window, wherein the identifying and comparing is using network configuration information from a communication network comprising a channel state information reference signal associated with the overlapped portion of the observation window, wherein the network configuration information comprises an indication of a size of the at least one sliding prediction window, and provides a configuration for the apparatus to predict one of downlink reception beam pair or downlink transmission beam pair as a new serving beam, wherein the network configuration information provides a configuration for the apparatus to predict one of downlink transmission beam identification or subset of downlink transmission beam identifications or one of downlink transmission beam identification as new serving beam, wherein the prediction window is overlapped with at least one next observation window over the time period, wherein the comparing is comprising comparing the beam prediction output of more than one observation window with the prediction window during the overlapped portion to perform the long term real time monitoring, wherein there is for each prediction of the at least one prediction output, obtaining at least one downlink transmission beam identification reference signal received power or at least one downlink transmission and reception beam pair identification reference signal received power provided by machine learning determining, wherein the machine learning determining is determining whether a predicted new serving downlink transmission beam or downlink transmission and reception beam pair identification beam pair will be configured for at least one of a physical uplink shared channel, physical uplink control channel, physical downlink shared channel, or a physical downlink control channel, wherein the at least one of a downlink reception beam or a downlink transmission beam pair is from at least one of a downlink reception beam pair observation window or downlink transmission beam pair observation window, wherein the reference signal received power measurements are provided from time t to time t−N, wherein the determining the first prediction window is overlapped is during a time t to t+K, and wherein predicting the first prediction window with the prediction output is from time t to t+L, wherein the predicted sequence of beam measurements are associated with sliding windows based on reference signal received power measurements, wherein there is receiving from the communication network information comprising an indication comprising a channel state information reference signal according to overlapped portions of at least one of the more than one sliding prediction window of time or the concurrent at least one observation window of time, wherein there is performing training and run an inference to obtain a reference signal received power of a set of reference signal received power measurement beam predictions, wherein the at least one prediction output is based on measuring layer 1 reference signal received power measurements, wherein the at least one prediction output is based on the layer 1 reference signal and assistant information comprising beam identifications, user equipment positions, and a line of sight or non-line of sight indication is used as input of neural network based AI/ML an artificial intelligence or machine learning model, wherein the predicted sequence is of reference signal received power over time, and/or wherein the comparing the beam prediction output with measurements in overlap part is during time t to t+M using the predicted sequence of beam measurements from the at least one observation window.

A non-transitory computer-readable medium storing program code, the program code executed by at least one processor to perform at least the method as described in the paragraphs above.

In yet another example aspect of the invention, there is an apparatus comprising: means for using a predicted sequence of beam measurement outputs for at least one observation window associated with at least one prediction window providing reference signal received power measurements to predict a beam prediction output, wherein the beam prediction output consists of Top-1 or Top-K beam identifications or predicted reference signal received power of a subset of beams associated with the beam prediction output; means for identifying that a prediction window of the at least one prediction window is overlapped with at least a portion of an observation window of the at least one observation window over a time period; means for comparing the beam prediction output during the overlapped portion with measurements of the observation window during the overlapped portion to perform long term real time monitoring to determine at least one prediction output for use in a next time instant, wherein the determining is based on a predicted reference signal received power of the at least one prediction output being above a threshold.

A communication system comprising the network side apparatus and the user equipment side apparatus performing operations as described above.

BRIEF DESCRIPTION OF THE DRAWINGS

The above and other aspects, features, and benefits of various embodiments of the present disclosure will become more fully apparent from the following detailed description with reference to the accompanying drawings, in which like reference signs are used to designate like or equivalent elements. The drawings are illustrated for facilitating better understanding of the embodiments of the disclosure and are not necessarily drawn to scale, in which:

FIG. 7 shows a method in accordance with example embodiments of the invention which may be performed by an apparatus.

DETAILED DESCRIPTION

Figure 1:
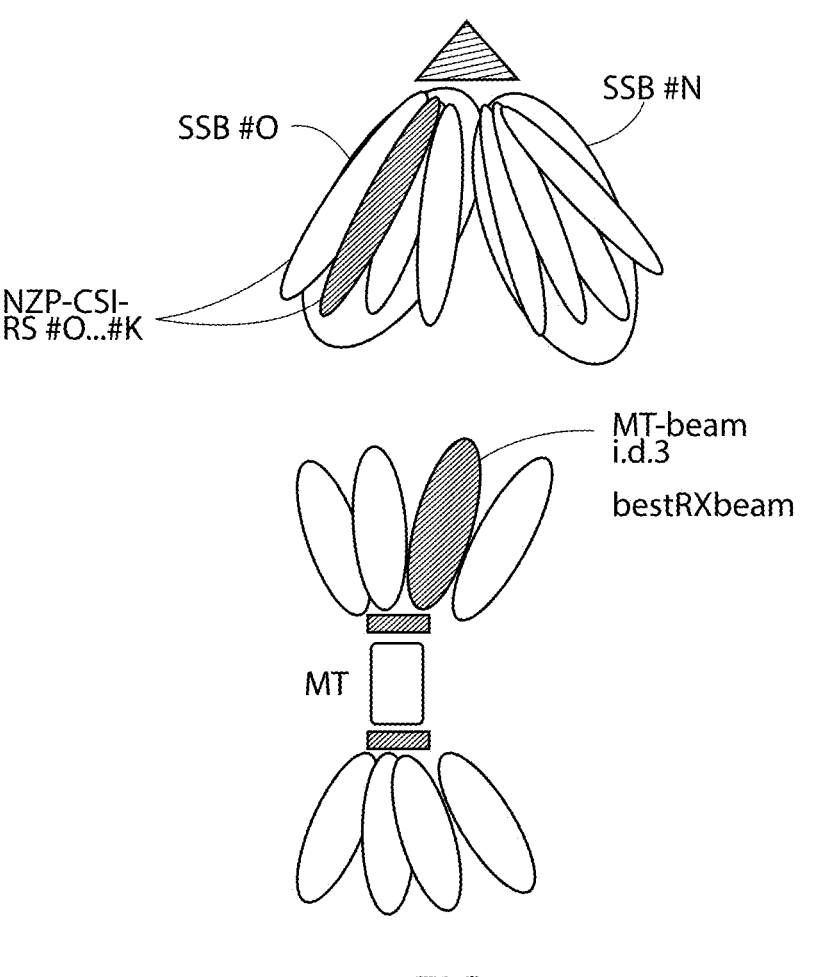
FIG. 1 shows a Synchronization Signal Block and associated Channel State Information Reference Signal for downlink (DL) beam management or downlink beam-pairs.

In example embodiments of this invention there is proposed at least a method and apparatus for a new user equipment sided-model with prediction quality indication using overlapped sliding window prediction.

AI/ML-Based Beam Management

To support a new AI/ML-enabled radio interface for the next cellular systems, 3GPP is currently investigating a new study item (RP-213599) for Release 18. AI/ML-based beam management targets spatial and/or time beam prediction for overhead and latency reduction.

The beam management use case is further studied for spatial and/or time domain beam prediction. The scope of spatial beam prediction (BM-Case1) is to predict the best downlink top-1 or top-K Tx beam(s), or best downlink Tx-Rx beam pairs in different spatial locations. Time-domain beam predictions (BM-Case2) aim to predict the most likely beam to use for next time instants. e.g., beam prediction in the spatial domain (BM-Case1).

SI Scope for Beam Management with AI/ML

In a study on Artificial Intelligence (AI)/Machine Learning (ML) for NR Air Interface, agreed in standards at the time of this application includes a use cases to focus on:

Initial set of use cases includes:

CSI feedback enhancement, e.g., overhead reduction, improved accuracy, prediction [RAN1];

Beam management, e.g., beam prediction in time, and/or spatial domain for overhead and latency reduction, beam selection accuracy improvement [RAN1];

Positioning accuracy enhancements for different scenarios including, e.g., those with heavy NLOS conditions [RAN1];

Finalize representative sub use cases for each use case for characterization and baseline performance evaluations by RAN #98:

The AI/ML approaches for the selected sub use cases need to be diverse enough to support various requirements on the gNB-UE collaboration levels Note: the selection of use cases for this study solely targets the formulation of a framework to apply AI/ML to the air-interface for these and other use cases. The selection itself does not intend to provide any indication of the prospects of any future normative project.

Study the 3GPP framework for AI/ML for air-interface corresponding to each target use case regarding aspects such as performance, complexity, and potential specification impact.

In an agreement:

For AI/ML functionality identification and functionality-based LCM of UE-side models and/or UE-part of two-sided models:

Functionality refers to an AI/ML-enabled Feature/FG enabled by configuration(s), where configuration(s) is (are) supported based on conditions indicated by UE capability;

Correspondingly, functionality-based LCM operates based on, at least, one configuration of AI/ML-enabled Feature/FG or specific configurations of an AI/ML-enabled Feature/FG:

FFS: Signalling to support functionality-based LCM operations, e.g., to activate/deactivate/fallback/switch AI/ML functionalities;

FFS: Whether/how to address additional conditions (e.g., scenarios, sites, and datasets) to aid UE-side transparent model operations (without model identification) at the Functionality level;

FFS: Other aspects that may constitute Functionality;

FFS: which aspects should be specified as conditions of a Feature/FG available for functionality will be discussed in each sub-use-case agenda;

For AI/ML model identification and model-ID-based LCM of UE-side models and/or UE-part of two-sided models:

model-ID-based LCM operates based on identified models, where a model may be associated with specific configurations/conditions associated with UE capability of an AI/ML-enabled Feature/FG and additional conditions (e.g., scenarios, sites, and datasets) as determined/identified between UE-side and NW-side;

FFS: Which aspects should be considered as additional conditions, and how to include them into model description information during model identification will be discussed in each sub-use-case agenda;

FFS: Relationship between functionality and model, e.g., whether a model may be identified referring to functionality(s);

FFS: relationship between functionality-based LCM and model-ID-based LCM.

Note: Applicability of functionality-based LCM and model-ID-based LCM is a separate discussion.

Prior to the above agreement the following was agreed to:

For UE-side models and UE-part of two-sided models:

For AI/ML functionality identification

Reuse legacy 3GPP framework of Features as a starting point for discussion.

UE indicates supported functionalities/functionality for a given sub-use-case.

UE capability reporting is taken as starting point;

For AI/ML model identification

Models are identified by model ID at the Network. UE indicates supported AI/ML models;

In functionality-based LCM

Network indicates activation/deactivation/fallback/switching of AI/ML functionality via 3GPP signaling (e.g., RRC, MAC-CE, DCI);

Models may not be identified at the Network, and UE may perform model-level LCM:

Study whether and how much awareness/interaction NW should have about model-level LCM;

In model-ID-based LCM, models are identified at the Network, and Network/UE may activate/deactivate/select/switch individual AI/ML models via model ID.

It is noted that for further study is relationship between functionality identification and model identification, as well as performance monitoring and RAN4 impact AI/ML Beam Management Typically, the UE will be configured with at least one beam (reference signal) used as reference for receiving/transmitting data and control channels. UE may be have one or more PDCCH channels and one or more PDSCH channels configured that are received on one or more DL beams. UE may be capable of beamforming (i.e. it may be capable of forming UL/DL beams for TX and RX) or it may use omnidirectional transmission and reception.

In 3GPP NR 5G, the cell (one gNB may have one or more cells) area may be covered using one or more beams provided by one or more Transmission/Reception Points (TRPs) consists of TRP #1, . . . . TRP #X.

Each beam may carry and identifier enabling UE to identify a beam and perform measurements (e.g. received power, RSRP reference signal received power) and other relevant measurements associate with specific identifier. Each SSB can be identified based on the identifier carried by SSB block. Furthermore, for downlink measurement signals for beam management SSB beam may be further used to train.

For downlink measurement signals for beam management NZP-CSI-RSs (non-zero power channel state information reference signal) may be configured. Thus the beam management from downlink perspective can be performed using SSB and CSI-RS signals As an example the SSB may be further used to train more e.g. UE may be configured to report N highest quality SSB beams, and network may further configure UE to report M highest quality CSI-RS (#0 . . . #K) beams associated with the specific SSB (e.g. SSB #0). This association may be configured by network.

FIG. 1 shows a Synchronization Signal Block and associated Channel State Information Reference Signal for downlink (DL) beam management or downlink beam-pairs. As shown in FIG. 1 there is a transmission point (TRP) outputting synchronization signal blocks #0-#N and associated Channel State Information Reference Signals RS #0-#K. Also in FIG. 1 is an MT with MT beams including a best RX beam.

UE Beamforming with Multi-Panel Configuration

The NR5G also supports UE beamforming. In lower frequencies, UE may be not use beamforming and may operate with omnidirectional beam (e.g. equal gain on all directions for transmission and/or reception). However, in high frequency, i.e., above 6 GHz, the UE may have one or more antenna panels that form one or more beams as shown in FIG. 2.

The channel between the NW node and the UE changes continuously and the UE may report measurements performed in highly variable channel conditions. To avoid signal degradation, the UE may also decide to switch the antenna panel. Therefore, the measurements will be performed by one or more Rx antenna panels. If the model is at UE side, NW and may use for the model input/output measurements reported from multiple UE panels as it is not aware of the UE switching the panel.

Figure 2:
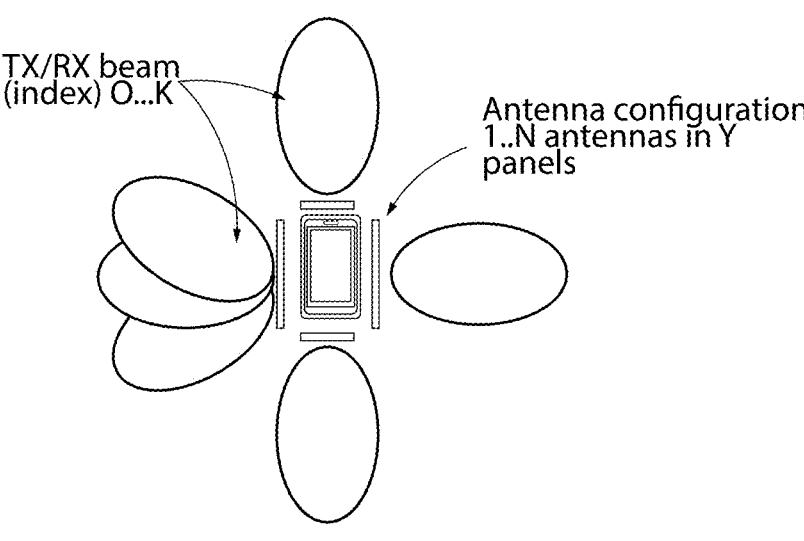
FIG. 2 shows user equipment beamforming with multi-panel configuration.

FIG. 2 shows user equipment beamforming with multi-panel configuration. As shown in FIG. 2 there is a UE beamforming with a TX/RX beam (index) 0 . . . k and antenna configuration 1 . . . . N antennas in Y panels. This beamforming using TX/RX beam (index) 0 . . . k, and antenna configuration 1 . . . . N antennas in Y panels.

In RAN WG #1 #112bis-e AI 9.2.1, the following was agreed on functionality identification and model identification defining the basic framework for the 3GPP framework for AI/ML.

Temporal-Domain Beam Prediction

For beam prediction use-case, the gNB or UE can predict the best beam in both spatial domain (BM-Case1) and temporal domain (BM-Case2). The gNB or UE can perform prediction by running inference or perform training.

In time domain beam prediction (BM-Case2), the gNB or UE can perform training or run the inference to predict Set A beams or Top-K of Set A beams in future time instants. In BM-Case2, the gNB or UE can use the historic measurement results of set B beams to predict setA beams where (i) Set B beams is subset of SetA, (ii) SetB is different from SetA, i.e., SetB represents set of wide beams and SetA represents set of narrow beams and (iii) Set B beams is the same as Set A beams.

Figure 3:
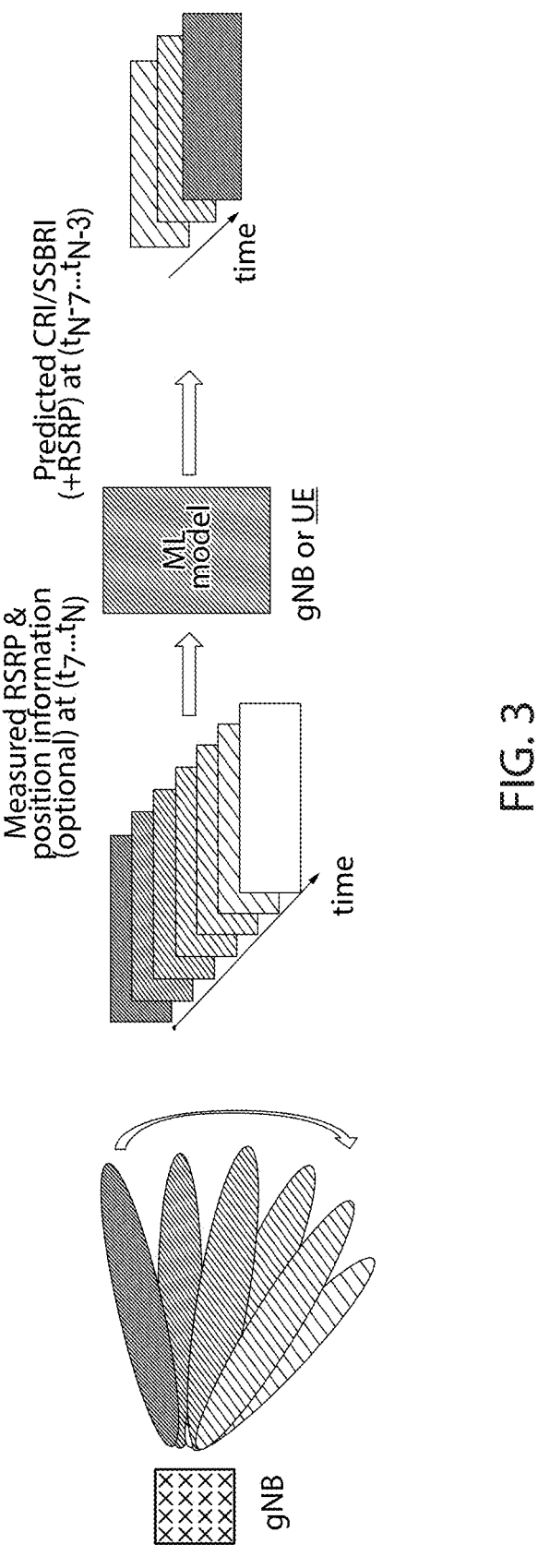
FIG. 3 shows a Temporal/Time domain prediction.

FIG. 3 shows a Temporal/Time domain prediction. As shown in FIG. 3 there is transmissions over time from a gNB for measuring RSRP and position information, such as at the different times, in order to form a prediction output. As shown in FIG. 3 there is beamforming from a gNB over time using measure RSRP and optionally position information T1 . . . . Tn, where an ML model is predicted with CRI/SSBR+RSRP over time.

For UE-sided model, the UE can perform prediction and report the predicted Set A beam i.d. (s)/RSRP or Top-K of Set A beam i.d(s)/RSRP in future time steps to the NW.

Also, for NW-sided model, the NW predict Set A beam i.d. (s)/RSRP or Top-K of Set A beam i.d. (s)/RSRP in future time steps using history of Set B beam measurement reported by UE.

In standards at the time of this application, although the UE sided model and UE monitoring are introduced, there is not any "real time" monitoring mechanism or UE reporting on "real time" monitoring capability. Example embodiments of the invention work to address at least these shortfalls.

Figure 8:
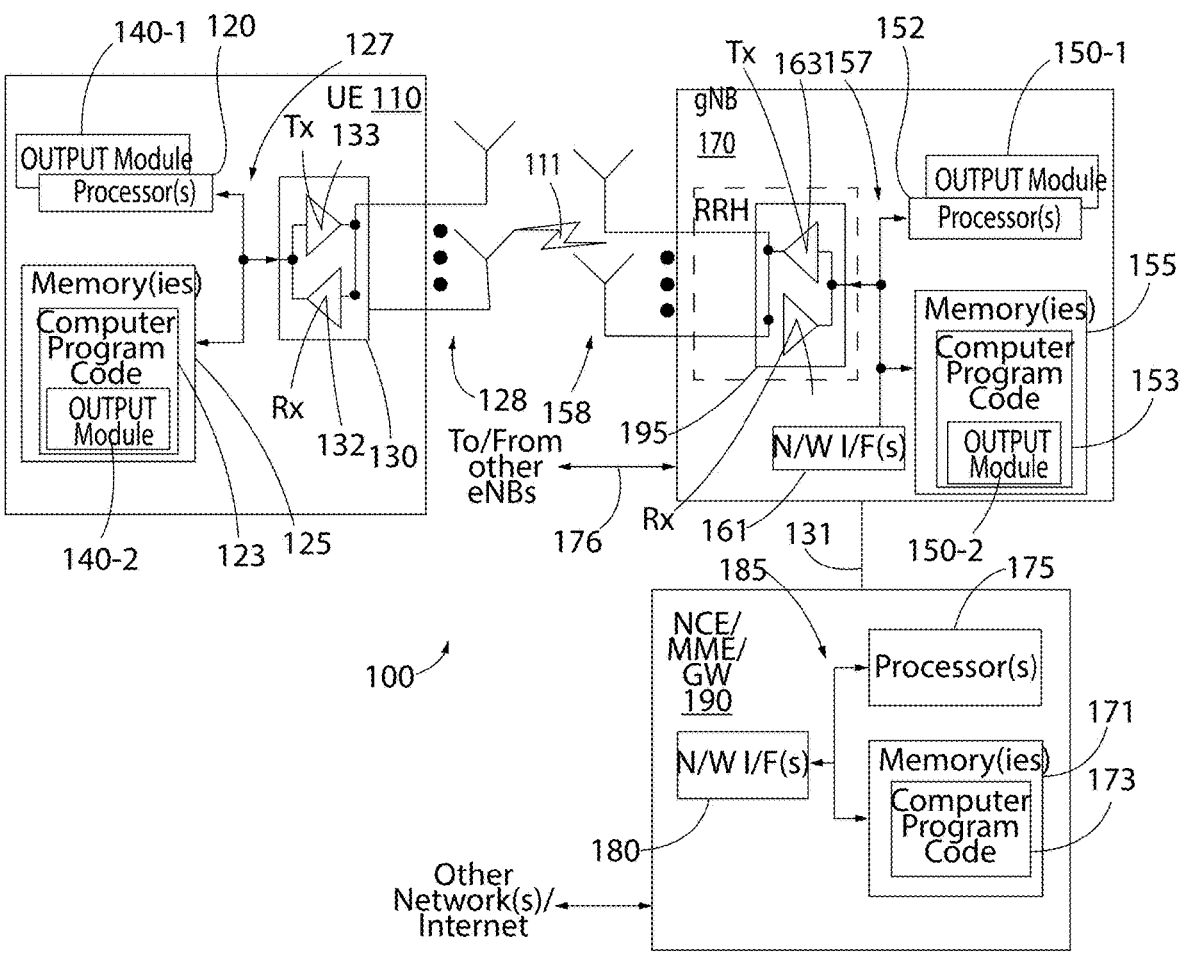
FIG. 8 shows a high level block diagram of various devices used in carrying out various aspects of the invention.

Before describing the example embodiments as disclosed herein in detail, reference is made to FIG. 8 for illustrating a simplified block diagram of various electronic devices that are suitable for use in practicing the example embodiments of this invention.

FIG. 8 is a block diagram of one possible and non-limiting system in which the example embodiments may be practiced.

Turning to FIG. 8, this figure shows a block diagram of one possible and non-limiting example in which the examples may be practiced. A user equipment (UE) 110, and a radio access LTE, 5G, or 6G network base station i.e., gNB 170, and NCE/MME/GW 190 are illustrated. In the example of FIG. 8, the user equipment (UE) 110 is in wireless communication with a wireless network 100. A UE is a wireless device that can access the wireless network 100.

The UE 110 includes one or more processors 120, one or more memories 125, and one or more transceivers 130 interconnected through one or more buses 127. Each of the one or more transceivers 130 includes a receiver, Rx, 132 and a transmitter, Tx, 133. The one or more buses 127 may be address, data, or control buses, and may include any interconnection mechanism, such as a series of lines on a motherboard or integrated circuit, fiber optics or other optical communication equipment, and the like. The one or more transceivers 130 are connected to one or more antennas 128. The one or more memories 125 include computer program code 123. The UE 110 includes a output module 140, comprising one of or both parts 140-1 and/or 140-2, which may be implemented in a number of ways. The output module 140 may be implemented in hardware as output module 140-1, such as being implemented as part of the one or more processors 120. The output module 140-1 may be implemented also as an integrated circuit or through other hardware such as a programmable gate array. In another example, the output module 140 may be implemented as output module 140-2, which is implemented as computer program code 123 and is executed by the one or more processors 120. For instance, the one or more memories 125 and the computer program code 123 may be configured to, with the one or more processors 120, cause the user equipment 110 to perform one or more of the operations as described herein. The UE 110 communicates with gNB 170 via a wireless link 111.

The gNB 170 in this example is a base station that provides access by wireless devices such as the UE 110 to the wireless network 100. The gNB 170 may be, for example, a base station for 5G, also called New Radio (NR). In 5G, the gNB 170 may be a NG-RAN node, which is defined as either a gNB or an ng-NB. A gNB is a node providing NR user plane and control plane protocol terminations towards the UE, and connected via the NG interface to a 5GC (such as, for example, the NCE/MME/GW 190). The ng-eNB is a node providing E-UTRA user plane and control plane protocol terminations towards the UE, and connected via the NG interface to the 5GC. The NG-RAN node may include multiple gNBs, which may also include a central unit (CU) (gNB-CU) 196 and distributed unit(s) (DUs) (gNB-DUs), of which DU 195 is shown. Note that the DU may include or be coupled to and control a radio unit (RU). The gNB-CU is a logical node hosting radio resource control (RRC), SDAP and PDCP protocols of the gNB or RRC and PDCP protocols of the en-gNB that controls the operation of one or more gNB-DUs. The gNB-CU terminates the F1 interface connected with the gNB-DU. The F1 interface is illustrated as reference 198, although reference 198 also illustrates a link between remote elements of the gNB 170 and centralized elements of the gNB 170, such as between the gNB-CU 196 and the gNB-DU 195. The gNB-DU is a logical node hosting RLC, MAC and PHY layers of the gNB or en-gNB, and its operation is partly controlled by gNB-CU. One gNB-CU supports one or multiple cells. One cell is supported by only one gNB-DU. The gNB-DU terminates the F1 interface 198 connected with the gNB-CU. Note that the DU 195 is considered to include the transceiver 160, e.g., as part of a RU, but some examples of this may have the transceiver 160 as part of a separate RU, e.g., under control of and connected to the DU 195. The gNB 170 may also be an eNB (evolved NodeB) base station, for LTE (long term evolution), or any other suitable base station or node.

The gNB 170 includes one or more processors 152, one or more memories 155, one or more network interfaces (N/W I/F(s)) 161, and one or more transceivers 160 interconnected through one or more buses 157. Each of the one or more transceivers 160 includes a receiver, Rx, 162 and a transmitter, Tx, 163. The one or more transceivers 160 are connected to one or more antennas 158. The one or more memories 155 include computer program code 153. The CU 196 may include the processor(s) 152, memories 155, and network interfaces 161. Note that the DU 195 may also contain its own memory/memories and processor(s), and/or other hardware, but these are not shown.

The gNB 170 includes a output module 150, comprising one of or both parts 150-1 and/or 150-2, which may be implemented in a number of ways. The output module 150 may be implemented in hardware as output module 150-1, such as being implemented as part of the one or more processors 152. The output module 150-1 may be implemented also as an integrated circuit or through other hardware such as a programmable gate array. In another example, the output module 150 may be implemented as output module 150-2, which is implemented as computer program code 153 and is executed by the one or more processors 152. For instance, the one or more memories 155 and the computer program code 153 are configured to, with the one or more processors 152, cause the gNB 170 to perform one or more of the operations as described herein. Note that the functionality of the output module 150 may be distributed, such as being distributed between the DU 195 and the CU 196, or be implemented solely in the DU 195.

The one or more network interfaces 161 communicate over a network such as via the links 176 and 131. Two or more gNBs 170 may communicate using, e.g., link 176. The link 176 may be wired or wireless or both and may implement, for example, an Xn interface for 5G, an X2 interface for LTE, or other suitable interface for other standards.

The one or more buses 157 may be address, data, or control buses, and may include any interconnection mechanism, such as a series of lines on a motherboard or integrated circuit, fiber optics or other optical communication equipment, wireless channels, and the like. For example, the one or more transceivers 160 may be implemented as a remote radio head (RRH) 195 for LTE or a distributed unit (DU) 195 receiver for gNB implementation for 5G, with the other elements of the gNB 170 possibly being physically in a different location from the RRH/DU, and the one or more buses 157 could be implemented in part as, for example, fiber optic cable or other suitable network connection to connect the other elements (e.g., a central unit (CU), gNB-CU) of the gNB 170 to the RRH/DU 195. Reference 198 also indicates those suitable network link(s).

It is noted that description herein indicates that "cells" perform functions, but it should be clear that equipment which forms the cell may perform the functions. The cell makes up part of a base station. That is, there can be multiple cells per base station. For example, there could be three cells for a single carrier frequency and associated bandwidth, each cell covering one-third of a 360 degree area so that the single base station's coverage area covers an approximate oval or circle. Furthermore, each cell can correspond to a single carrier and a base station may use multiple carriers. So if there are three 120 degree cells per carrier and two carriers, then the base station has a total of 6 cells.

The wireless network 100 may include a network element or elements 190 that may include core network functionality. Further, this NCE/MME/GW 190 can for example perform Access & Mobility Management Function (AMF), Location Management Function (LMF), Mobility Management Entity (MME), Network Control Element (NCE), Policy Control Function (PCF), Serving Gateway (SGW), Session Management Function (SMF), and Unified Data Management (UDM). The NCE/MME/GW 190 provides connectivity via a link or links 181 with a further network, such as a telephone network and/or a data communications network (e.g., the Internet). Such core network functionality for 5G may include access and mobility management function(s) (AMF(S)) and/or user plane functions (UPF(s)) and/or session management function(s) (SMF(s)). Such core network functionality for LTE may include MME (Mobility Management Entity)/SGW (Serving Gateway) functionality. These are merely example functions that may be supported by the NCE/MME/GW 190, and note that both 5G and LTE functions might be supported. The gNB 170 is coupled via a link 131 to the network element 190. The link 131 may be implemented as, e.g., an NG interface for 5G, or an SI interface for LTE, or other suitable interface for other standards. The network element 190 includes one or more processors 175, one or more memories 171, and one or more network interfaces (N/W I/F(s)) 180, interconnected through one or more buses 185. The one or more memories 171 include computer program code 173. The one or more memories 171 and the computer program code 173 are configured to, with the one or more processors 175, cause the network element 190 to perform one or more operations.

The wireless network 100 may implement network virtualization, which is the process of combining hardware and software network resources and network functionality into a single, software-based administrative entity, a virtual network. Network virtualization involves platform virtualization, often combined with resource virtualization. Network virtualization is categorized as either external, combining many networks, or parts of networks, into a virtual unit, or internal, providing network-like functionality to software containers on a single system. Note that the virtualized entities that result from the network virtualization are still implemented, at some level, using hardware such as processors 152 or 175 and memories 155 and 171, and also such virtualized entities create technical effects.

The computer readable memories 125, 155, and 171 may be of any type suitable to the local technical environment and may be implemented using any suitable data storage technology, such as semiconductor based memory devices, flash memory, magnetic memory devices and systems, optical memory devices and systems, fixed memory and removable memory. The computer readable memories 125, 155, and 171 may be means for performing storage functions. The processors 120, 152, and 175 may be of any type suitable to the local technical environment, and may include one or more of general purpose computers, special purpose computers, microprocessors, digital signal processors (DSPs) and processors based on a multi-core processor architecture, as non-limiting examples. The processors 120, 152, and 175 may be means for performing functions, such as controlling the UE 110, gNB 170, NCE/MME/GW 190, and other functions as described herein.

In general, the various embodiments of the user equipment 110 can include, but are not limited to, cellular telephones such as smart phones, tablets, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, tablets with wireless communication capabilities, as well as portable units or terminals that incorporate combinations of such functions.

One or more of output modules 140-1, 140-2, 150-1, and 150-2 may be configured to implement high level syntax for a compressed representation of neural networks based on the examples described herein. Computer program code 173 may also be configured to implement high level syntax for a compressed representation of neural networks based on the examples described herein.

Further, the various embodiments of any of these devices can be used with a UE vehicle, a High Altitude Platform Station, or any other such type node associated with a terrestrial network or any drone type radio or a radio in aircraft or other airborne vehicle or a vessel that travels on water such as a boat.

As similarly stated above, in standards discussions at the time of this disclosure, although the UE sided model and UE monitoring are introduced, there is not any "real time" monitoring mechanism or UE reporting on "real time" monitoring capability. Example embodiments of the invention work to address at least these shortfalls.

BM-Case2 applicable conditions for functionalities associated with the BM-Case1 assuming DL Tx beam prediction, Support Top-K DL Tx beam prediction listed as the following:

K=1, 2, 4, [8]

This defines the support of predicting best-K NZP CSI-RS resources based on SSB and/or CSI-RS-based RSRP measurements.

Set B Conditions:

Measured DL RS (SSB, CSI-RS)

Defines support of using SSB and/or CSI-RS-based RSRP measurements;

Measured DL RS set dimension (4, 8, 12, [16]):

Indicates the minimum number of NZP-CSI-RS resources that shall be measured and used by the UE for predicting best-K NZP CSI-RS resources;

Measured DL RS set periodicity (40 ms, 80 ms):

Indicates the minimum time duration for measuring NZP-CSI-RS resources that shall be measured;

Measured DL RS set pattern (e.g., fixed, pre-configured list, random)

Indicates the limitations on Set B conditions.

Set a Conditions:

Predicted DL RS (CSI-RS)

Defines support of predicting CSI-RS resources

Predicted DL RS set dimension (12, 16, 32, 64)

Indicates the maximum number of NZP-CSI-RS resources that shall be configured as the prediction NZP-CSI-RS resource set Predicted DL RS set—number of future instances (40 ms, 80 ms)

Indicates the maximum time duration (or the number of future instances compared to measurement periodicity) that the NZP-CSI-RS resources can be predicted based on Set B.

NW-side performance monitoring conditions

Support measurements of Predicted DL RS set (full Set A, partial Set A)

Defines the support of measuring the NZP-CSI-RS resources that correspond to Set A.

Measurement periodicity (100 ms, 200 ms)

Indicates the minimum periodicity when supporting NZP-CSI-RS resources that correspond to Set A.

Conditions on supporting ML functionalities

Max number of supported functionalities (1, 2, 4, 8,)

Indicates the maximum number of functionalities (e.g., number of parameter combinations that enable ML-enabled feature) that can be configured toward the UE Delay in activating a functionality (2 ms, 4 ms,.)

Indicates the delay required when activating or switching a functionality

Generalization condition of functionalities (yes, no)

Indicates that the UE supports any functionality configured considering parameter combinations of 1-4z.

Furthermore, example embodiments of the invention propose specifically essential signalling between NW and UE identifying the conditions of the "real time" monitoring features, especially in time domain beam prediction, which has not been investigated so far to the best of our knowledge.

For DL Tx and DL Tx-Rx beam pair temporal domain beam prediction (TBP), the prediction output will be predicted as a sequence of outputs in multiple sequential time steps. The prediction can be performed by NW or UE. In the current 3GPP discussion, when NW or UE performs prediction in temporal/time domain, the predicted output is one sequence of outputs called a "prediction window" using one input sequence collected during the "observation window".

In LCM operations, how time domain prediction outputs are monitored such that:

When UE performs temporal domain beam prediction and UE performs model monitoring, how the UE could compare the prediction with ground truth real time; and When the prediction performance degrades, how the UE is configured to switch between Model #A and Model #B or switch back to legacy.

Figure 4:
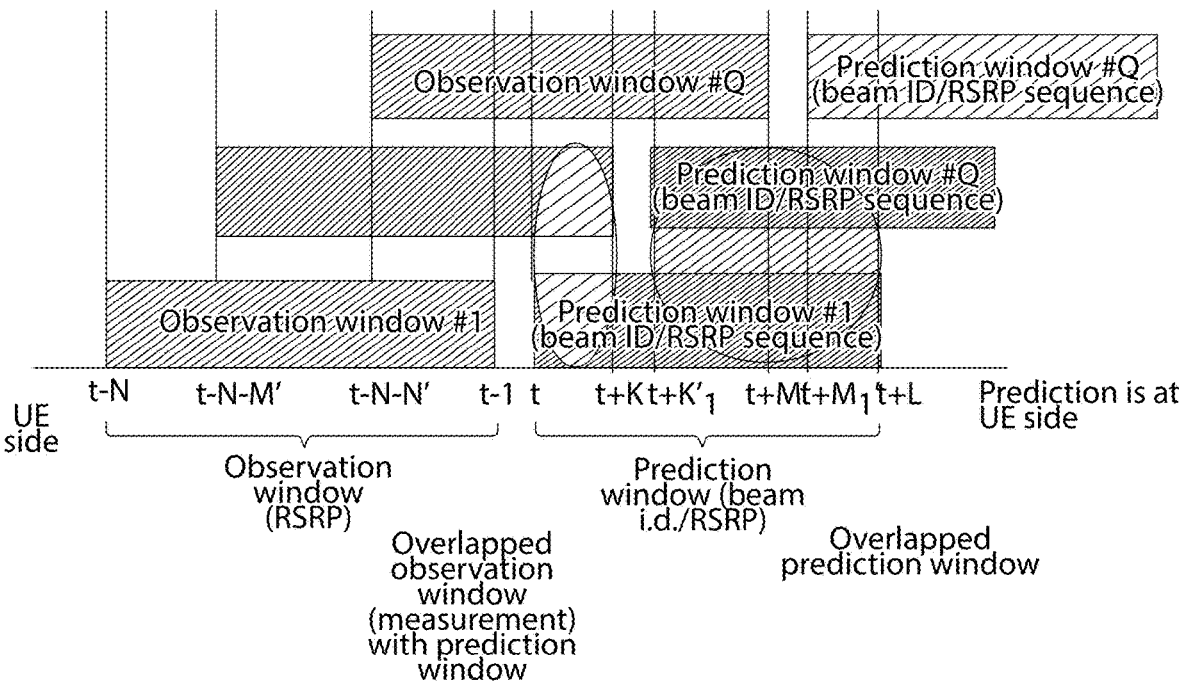
FIG. 4 shows a Temporal domain beam prediction (TBP) when (i) the prediction windows overlapped with each other and (ii) the observation window overlapped with some portion of prediction window.

FIG. 4 shows a Temporal domain beam prediction (TBP) when (i) the prediction windows overlapped with each other and (ii) the observation window overlapped with some portion of prediction window In FIG. 4, AI/ML model is at UE side. The UE performs L1-RSRP measurement and creates sliding windows and label the data in data pre-processing part. Therefore, the UE will have multiple sliding windows of L1-RSRP or sliding windows of L1-RSRP concatenate with assistant information, e.g., UEs positions, Tx beam angles, LoS/nLos indication, and etc. The input to neural network can be L1-RSRP or L1-RSRP concatenate with assistant information These windows include an RSRP observation window #1, observation window #P, observation window #Q, prediction window #1 with a beam ID/RSRP sequence, prediction window #P with a beam ID/RSRP sequence, and prediction window #Q with a beam ID/RSRP sequence.

UE uses sequence of the SetB beams RSRP/LI-RSRP measurements, such that Set B beams RSRP/L1-RSRP measurements for observation window #1 (measurement from time t-N to time t−1), to predict prediction window #1 (prediction output from time t to t+L.

The predicted output consists of Top-1 or Top-K beam IDs of SetA or predicted RSRP of SetA beams.

Accordingly, the prediction window #1 and prediction window #P overlap with each other from time t+KA to time t+L How could the UE handle the overlapped prediction part? When considering observation window #1 & prediction window #1 with observation window #P & prediction window #P, there is overlapped portion of observation window #P and prediction window #1 from time t to t+K:

This leads to UE capability for performing "real time" monitoring. The steps of UE reporting and how the NW will config UE to perform "real-time" monitoring, needs to be addressed.

Moreover, when considering observation window #1 & prediction window #1 with observation window #Q& prediction window #Q, there is overlapped portion of observation window #1 and prediction window #Q from time t to t+M':

The UE can perform "real-time" monitoring, where the UE can compare the prediction output with ground truth (measurements) during time t to t+M'. This leads to UE capability for performing "long-term real-time" monitoring.

In one embodiment, the "real time" monitoring capability includes that the UE might perform sensing for data collection and perform prediction at the same time.

Moreover, there are no solutions on how to handle when the predicted sequence outputs "multiple prediction windows" are overlapped with each other as illustrated in FIG. 4.

Figure 5:
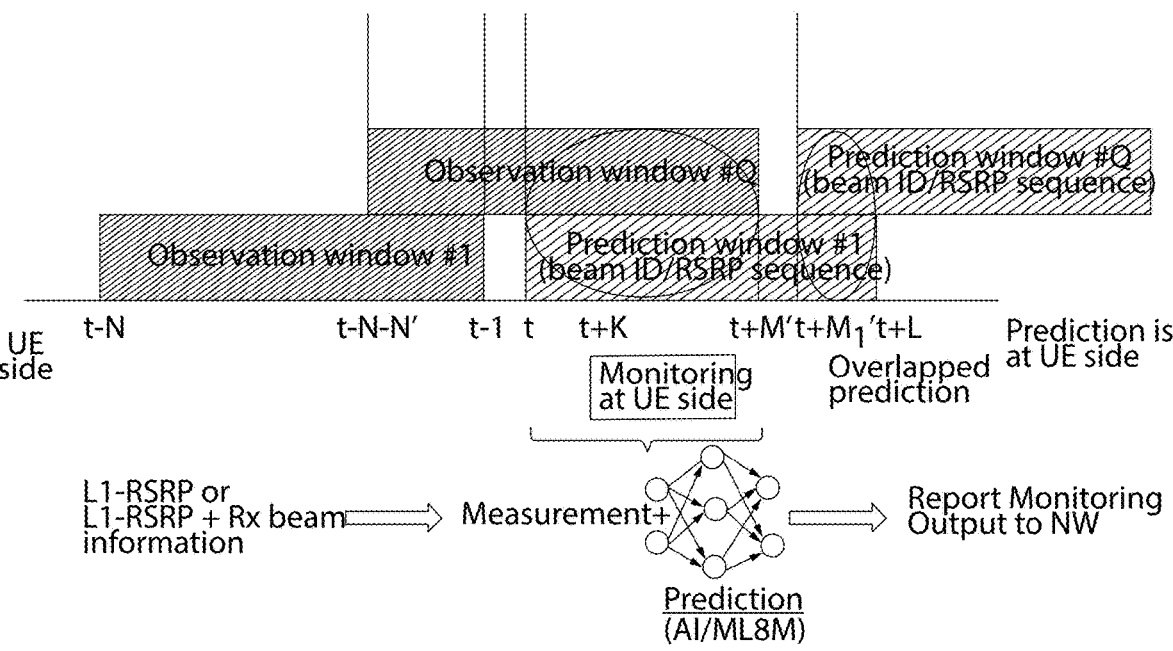
FIG. 5 shows a user equipment capability in real-time monitoring based temporal domain beam prediction.

Some novel features introduced by example embodiments of this invention are represented at high level at least in FIG. 4 & FIG. 5 are summarized as follows:

For each prediction, obtaining at least one DL Tx beam ID/RSRP or at least one DL Tx-Rx beam pair ID/RSRP which provided by ML determining whether a predicted new serving DL Tx beam or DL Tx-Rx beam pair will be configured for at least one of (PUSCH/PUCCH/PDSCH/PDCCH), e.g. if the prediction provides at least one beam ID in the DL Top 1 or Top-K beams that is already a serving beam, NW may not update the serving beam or beams to UE. The determination can be done for each channel separately or same beam may be used for each of the DL/UL channels).

In example embodiments of this invention, there can be assumed a UE-sided model. Therefore, the network may need to estimate the reliability of the UE prediction.

To determine whether the UE prediction is reliable or not, monitoring based LCM operations needs to be taken into consideration. Especially "Real Time" monitoring mechanism are introduced.

Example embodiments of the disclosure introduce a method of "Real Time" monitoring at UE side in temporal domain beam prediction (TBP), where the UE can verify the prediction output with the ground truth real time as shown in FIG. 5.

The UE can verify the monitoring output based on at least quality metric, i.e., (i) L1-RSRP. Difference (difference between predicted L1-RSRP and L1-RSRP measurement), (ii) accuracy of the Top-1 or Top-K beam IDs prediction compare with ground truth.

The top-1 or top-K beams predictions or L1-RSRP predictions within time window, where:

UE predictions can determine whether a beam failure (e.g., link communication between UE and NW is not reliable such that L1-RSRP predictions<threshold, or L1-RSRP of Top-1/Top-K beam predictions<threshold). This beam failure evaluation may be used, e.g., PDCCH beams.

A UE that performs the L1-RSRP measurements corresponding to the DL Tx beam or DL Tx-Rx beam pairs. The UE may determine the Rx beam corresponding to received Rx antenna panel to be used for DL Tx beam measurements. The UE shall perform the L1-RSRP measurements corresponding to the indicated/defined DL Rx beam.

Then, the UE will feed L1-RSRP as input into neural network for DL Tx beam prediction. These can feed L1-RSRP or L1-RSRP and assistant information, e.g., UE positions, LoS or nLoS indication, UE Rx panel ID for Rx beam etc.

The UE will feed L1-RSRP and DL Rx beam information, i.e., Rx beam IDs as input into neural network for DL Tx-Rx beam pairs prediction. Further, these can feed L1-RSRP and DL Rx beam information or L1-RSRP and DL Rx beam information including assistant information, e.g., UE positions, LoS or nLoS indication, UE Rx panel ID for Rx beam etc.

In FIG. 5, with the overlap portion of observation window #Q and prediction window #1, the UE will have capability of performing "long term real-time" monitoring, where the UE performs measurements and prediction at the same time.

With this feature, the UE can report the monitoring output in long term efficiently.

Example embodiments as in this disclosure address the new configuration from NW to UE and new indication reporting from UE to NW in this invention.

UE Side Time-Domain Beam Prediction Monitoring Mechanism

In this section, there is provided DL Tx temporal beam prediction, where the monitoring at UE side-based LCM operations is addressed.

DL Tx Beam Prediction

In FIG. 5, there is provided signaling and configurations from NW to UE for DL Tx beam prediction, where the UE can determine DL Rx beam with respect to DL Rx panel for measuring DL Tx beams. The UE will use the determined DL Rx beam to measure the received signal received power (RSRP) from the DL Tx beams. Then the UE will use the sequence of RSRP/LI-RSRP over time as input of neural network.

Figure 6:
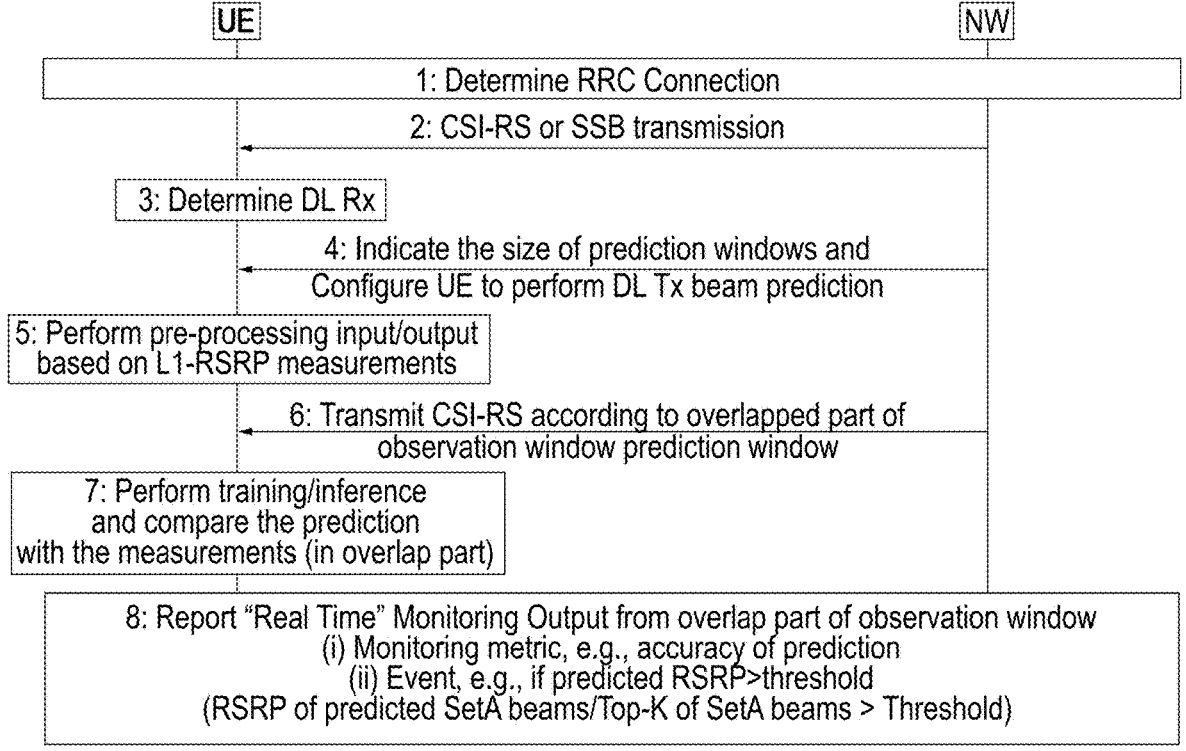
FIG. 6 shows Signaling diagram illustrates the enhancement of "Real-Time" monitoring procedure and the configurations to be used for DL Tx prediction at UE-sided.

The procedure of the NW configuration, the reporting from UE and "real time monitoring" mechanism are described in FIG. 6.

FIG. 6 shows Signaling diagram illustrates the enhancement of "Real-Time" monitoring procedure and the configurations to be used for DL Tx prediction at UE-sided.

The signaling diagram of FIG. 6 illustrates enhancement of "Real-Time" monitoring procedure and the configurations to be used for DL Tx prediction at a UE-side.

Some key inventive steps are shown in steps 4, 6, 7, and 8 of FIG. 6. Detailed description including additional embodiments/dependent claims in these steps as shown in FIG. 6 are as follows:

1. In a beginning step of FIG. 6, the RRC configuration is determined. During the RRC configuration, the UE is configured to report the capability of performing measurements and performing prediction at the same time;

2. Then, the NW transmits one or more CSI-RS or SSB reference signals (RS) sweeping between Tx beams;

3. The UE determines DL Rx beams to measure DL Tx beams. The UE will measure the RSRP/L1-RSRP from Tx beams;

4. In accordance with example embodiments as in this disclosure, the NW indicates the size of prediction windows and configures UE to perform DL Tx beam prediction;

5. Then, the UE performs data preprocessing for input and label the output for DL Tx beam prediction based on L1-RSRP measurements;

6. In accordance with example embodiments as in this disclosure, the NW transmits CSI-RS according to overlapped part of observation window and prediction window;

7. The UE will then perform training or run the inference to obtain Top-1 or Top-K or L1-RSRP of SetA beam prediction. Then in accordance with example embodiments as in this disclosure, the UE compares the prediction output with the measurements in overlap part (overlap part of observation window and prediction window);

8. In accordance with example embodiments as in this disclosure, the UE reports "real time monitoring" output from the overlapped part of observation and prediction window which could be (i) Metric, i.e., accuracy of prediction and/or (ii) Event, e.g., if predicted RSRP or predicted L1-RSRP>threshold.

DL Tx-Rx Beam-Pairs Prediction

In FIG. 6, there is provided the signaling and the configurations from NW to UE for DL Tx-Rx beam pairs prediction, where the UE can determine DL Rx beam with respect to DL Rx panel for measuring DL Tx beams.

Then, the UE will use the determined DL Rx beam to measure the received signal received power (RSRP) for DL Tx-Rx beam pairs.

In beam-pairs prediction, the UE will use the sequence of RSRP/L1-RSRP as well as Rx beams information from the received/best Rx panel as input of neural network for temporal beam prediction.

The procedure of the NW configuration, the reporting from UE and monitoring based LCM procedure are described in FIG. 6.

FIG. 6: shows a signaling diagram illustrating the enhancement of "real-time" monitoring procedure and the configurations to be used for DL Tx-Rx beam pairs prediction at UE-sided.

Some key inventive steps are shown in steps 4, 6, 7, and 8 of FIG. 6.

The details as in FIG. 6 are described as follows:

1. In a beginning step of FIG. 6, the RRC configuration is determined. During the RRC configuration, the UE is configured to report the capability of performing measurements and performing prediction at the same time;

2. Then, the NW transmits one or more CSI-RS or SSB reference signals (RS) sweeping between Tx beams;

3. The UE determines DL Rx beams to measure DL Tx-Rx beam pairs. The UE will measure the RSRP/L1-RSRP from Tx-Rx beam pairs;

4. In accordance with example embodiments as in this disclosure, the NW indicates the size of prediction windows and configures UE to perform DL Tx-Rx beam-pairs prediction;

5. Then, the UE performs data preprocessing for input and label the output for DL Tx-Rx beam-pairs prediction based on L1-RSRP measurements;

6. In accordance with example embodiments as in this disclosure, the NW transmits CSI-RS according to overlapped part of observation window and prediction window;

7. The UE will then perform training or run the inference to obtain Top-1 or Top-K or L1-RSRP of SetA DL Tx-Rx beam-pairs prediction. Then, In accordance with example embodiments as in this disclosure, the UE compares the prediction output (in the overlap window) with the measurements (observation during the overlap part);

8. Then in accordance with example embodiments as in this disclosure, the UE reports "real time monitoring" output which could be (i) Metric, i.e., accuracy of prediction and/or (ii) Event, e.g., if predicted RSRP or predicted L1-RSRP>threshold.

UE Sided AI/ML Model

In one embodiment, the UE can perform prediction by perform training or run the inference. To obtain SetA beam IDs or Top1/Top-K beam IDs of setA, the UE might be configured to use LSTM or Conv-LSTM or Transformer model to perform temporal domain beam prediction.

After the UE obtain prediction output, the UE can perform "real time" monitoring with the capability supported, then report the "real time" monitoring output to NW.

In one embodiment, the "real time" monitoring capability includes that the UE might perform sensing for data collection and perform prediction at the same time.

In another embodiment, if the monitoring metric and/or Event are not satisfied, the NW might configure UE to update the AI/ML model or configure UE to download a new model.

FIG. 7 shows a method in accordance with example embodiments of the invention which may be performed by an apparatus.

FIG. 7 illustrates operations which may be performed by a device such as, but not limited to, a device such as a network device (e.g., the UE 110 as in FIG. 8). As shown in block 710 of FIG. 7 there is using a predicted sequence of beam measurement outputs for at least one observation window associated with at least one prediction window providing reference signal received power measurements to predict a beam prediction output. As shown in block 720 of FIG. 7 wherein the beam prediction output consists of Top-1 or Top-K beam identifications or predicted reference signal received power of a subset of beams associated with the beam prediction output. As shown in block 730 of FIG. 7 there is identifying that a prediction window of the at least one prediction window is overlapped with at least a portion of an observation window of the at least one observation window over a time period, As shown in block 740 of FIG. 7 there is comparing the beam prediction output during the overlapped portion with measurements of the observation window during the overlapped portion to perform long term real time monitoring to determine at least one prediction output for use in a next time instant. Then as shown in block 750 of FIG. 7 wherein the determining is based on a predicted reference signal received power of the at least one prediction output being above a threshold.

In accordance with the example embodiments as described in the paragraph above, wherein the at least one observation window comprises at least one sliding observation window of identification reference signal received power, and wherein the at least one prediction window comprises at least one sliding prediction window.

In accordance with the example embodiments as described in the paragraphs above, wherein the identifying and comparing is using network configuration information from a communication network comprising a channel state information reference signal associated with the overlapped portion of the observation window.

In accordance with the example embodiments as described in the paragraphs above, wherein the network configuration information comprises an indication of a size of the at least one sliding prediction window, and provides a configuration for the apparatus to predict one of downlink reception beam pair or downlink transmission beam pair as a new serving beam.

In accordance with the example embodiments as described in the paragraphs above, wherein the network configuration information provides a configuration for the apparatus to predict one of downlink transmission beam identification or subset of downlink transmission beam identifications or one of downlink transmission beam identification as new serving beam In accordance with the example embodiments as described in the paragraphs above, wherein the prediction window is overlapped with at least one next observation window over the time period, and wherein the comparing is comprising comparing the beam prediction output of more than one observation window with the prediction window during the overlapped portion to perform the long term real time monitoring.

In accordance with the example embodiments as described in the paragraphs above, wherein there is for each prediction of the at least one prediction output, obtaining at least one downlink transmission beam identification reference signal received power or at least one downlink transmission and reception beam pair identification reference signal received power provided by machine learning determining.

In accordance with the example embodiments as described in the paragraphs above, wherein the machine learning determining is determining whether a predicted new serving downlink transmission beam or downlink transmission and reception beam pair identification beam pair will be configured for at least one of a physical uplink shared channel, physical uplink control channel, physical downlink shared channel, or a physical downlink control channel.

In accordance with the example embodiments as described in the paragraphs above, wherein the at least one of a downlink reception beam or a downlink transmission beam pair is from at least one of a downlink reception beam pair observation window or downlink transmission beam pair observation window.

In accordance with the example embodiments as described in the paragraphs above, wherein the reference signal received power measurements are provided from time t to time t-N, wherein the determining the first prediction window is overlapped is during a time t to t+K, and wherein predicting the first prediction window with the prediction output is from time t to t+L.

In accordance with the example embodiments as described in the paragraphs above, wherein the predicted sequence of beam measurements are associated with sliding windows based on reference signal received power measurements.

In accordance with the example embodiments as described in the paragraphs above, wherein there is receiving from the communication network information comprising an indication comprising a channel state information reference signal according to overlapped portions of at least one of the more than one sliding prediction window of time or the concurrent at least one observation window of time.

In accordance with the example embodiments as described in the paragraphs above, wherein there is performing training and run an inference to obtain a reference signal received power of a set of reference signal received power measurement beam predictions.

In accordance with the example embodiments as described in the paragraphs above, wherein the at least one prediction output is based on measuring layer 1 reference signal received power measurements.

In accordance with the example embodiments as described in the paragraphs above, wherein the at least one prediction output is based on the layer 1 reference signal and assistant information comprising beam identifications, user equipment positions, and a line of sight or non-line of sight indication is used as input of neural network based AI/ML an artificial intelligence or machine learning model In accordance with the example embodiments as described in the paragraphs above, wherein the predicted sequence is of reference signal received power over time.

In accordance with the example embodiments as described in the paragraphs above, wherein the comparing the beam prediction output with measurements in overlap part is during time t to t+M using the predicted sequence of beam measurements from the at least one observation window.

A non-transitory computer-readable medium (Memory(ies) 125 as in FIG. 8) storing program code (Computer Program Code 123 and/or Output Module 140-2 as in FIG. 8), the program code executed by at least one processor (Processor(s) 120 and/or Output Module 140-1 as in FIG. 8) to perform the operations as at least described in the paragraphs above.

In accordance with an example embodiment of the invention as described above there is an apparatus comprising: means for using a predicted sequence of beam measurement outputs for at least one observation window associated with at least one prediction window providing reference signal received power measurements to predict a beam prediction output, wherein the beam prediction output consists of Top-1 or Top-K beam identifications or predicted reference signal received power of a subset of beams associated with the beam prediction output; means for identifying that a prediction window of the at least one prediction window is overlapped with at least a portion of an observation window of the at least one observation window over a time period; and means for comparing the beam prediction output during the overlapped portion with measurements of the observation window during the overlapped portion to perform long term real time monitoring to determine at least one prediction output for use in a next time instant, wherein the determining is based on a predicted reference signal received power of the at least one prediction output being above a threshold.

In the example aspect of the invention according to the paragraph above, wherein at least the means for using, identifying, and comparing comprises a non-transitory computer readable medium [Memory(ies) 125 as in FIG. 8] encoded with a computer program [Computer Program Code 123 and/or Output Module 140-2 as in FIG. 8] executable by at least one processor [Processor(s) 120 and/or Output Module 140-1 as in FIG. 8)].

Further, in accordance with example embodiments of the invention there is circuitry for performing operations in accordance with example embodiments of the invention as disclosed herein. This circuitry can include any type of circuitry including content coding circuitry, content decoding circuitry, processing circuitry, image generation circuitry, data analysis circuitry, etc.). Further, this circuitry can include discrete circuitry, application-specific integrated circuitry (ASIC), and/or field-programmable gate array circuitry (FPGA), etc. as well as a processor specifically configured by software to perform the respective function, or dual-core processors with software and corresponding digital signal processors, etc.). Additionally, there are provided necessary inputs to and outputs from the circuitry, the function performed by the circuitry and the interconnection (perhaps via the inputs and outputs) of the circuitry with other components that may include other circuitry in order to perform example embodiments of the invention as described herein.

In accordance with example embodiments of the invention as disclosed in this application this application, the "circuitry" provided can include at least one or more or all of the following:

(a) hardware-only circuit implementations (such as implementations in only analog and/or digital circuitry);

(b) combinations of hardware circuits and software, such as (as applicable):

(i) a combination of analog and/or digital hardware circuit(s) with software/firmware; and (ii) any portions of hardware processor(s) with software (including digital signal processor(s)), software, and memory(ies) that work together to cause an apparatus, such as a mobile phone or server, to perform various functions, such as functions or operations in accordance with example embodiments of the invention as disclosed herein); and (c) hardware circuit(s) and or processor(s), such as a microprocessor(s) or a portion of a microprocessor(s), that requires software (e.g., firmware) for operation, but the software may not be present when it is not needed for operation."

In accordance with example embodiments of the invention, there is adequate circuitry for performing at least novel operations in accordance with example embodiments of the invention as disclosed in this application, this 'circuitry' as may be used herein refers to at least the following:

(a) hardware-only circuit implementations (such as implementations in only analog and/or digital circuitry); and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions); and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in a server, a cellular network device, or other network device.

In general, the various embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

Embodiments of the inventions may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

The word "exemplary" is used herein to mean "serving as an example, instance, or illustration." Any embodiment described herein as "exemplary" is not necessarily to be construed as preferred or advantageous over other embodiments. All of the embodiments described in this Detailed Description are exemplary embodiments provided to enable persons skilled in the art to make or use the invention and not to limit the scope of the invention which is defined by the claims.

The foregoing description has provided by way of exemplary and non-limiting examples a full and informative description of the best method and apparatus presently contemplated by the inventors for carrying out the invention. However, various modifications and adaptations may become apparent to those skilled in the relevant arts in view of the foregoing description, when read in conjunction with the accompanying drawings and the appended claims. However, all such and similar modifications of the teachings of example embodiments of this invention will still fall within the scope of this invention.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. An apparatus, comprising:
at least one processor; and
at least one non-transitory memory storing instructions, that when executed by the at least one processor, cause the apparatus at least to:
use a sequence of beam measurements including reference signal received power measurements for at least one observation window to predict a beam prediction output for at least one prediction window using an artificial intelligence/machine learning (AI/ML) model,
wherein the beam prediction output includes beam identifications or predicted reference signal received power of a subset of beams associated with the beam prediction output;
identify that a prediction window of the at least one prediction window is overlapped with at least a portion of an observation window of the at least one observation window over a time period;

compare the beam prediction output during the overlapped portion with measurements of the observation window during the overlapped portion to perform long term real time monitoring to determine at least one of a prediction accuracy of the AI/ML model or a predicted event, wherein the predicted event is based on a predicted reference signal received power being above a threshold.

2. The apparatus of claim 1, wherein the at least one observation window comprises at least one sliding observation window of identification reference signal received power, and wherein the at least one prediction window comprises at least one sliding prediction window.

3. The apparatus of claim 2, wherein the identifying and comparing is using network configuration information from a communication network comprising a channel state information reference signal associated with the overlapped portion of the observation window.

4. The apparatus of claim 3, wherein the network configuration information comprises an indication of a size of the at least one sliding prediction window, and provides a configuration for the apparatus to predict one of downlink reception beam pair or downlink transmission beam pair as a new serving beam.

5. The apparatus of claim 3, wherein the network configuration information provides a configuration for the apparatus to predict one of downlink transmission beam identification or subset of downlink transmission beam identifications or one of downlink transmission beam identification as new serving beam.

6. The apparatus of claim 1, wherein the prediction window is overlapped with at least one next observation window over the time period, and wherein the comparing is comprising comparing the beam prediction output of more than one observation window with the prediction window during the overlapped portion to perform the long term real time monitoring.

7. The apparatus of claim 1, wherein the at least one non-transitory memory storing instructions that when executed by the at least one processor, cause the apparatus at least to:

for the beam prediction output, obtain at least one downlink transmission beam identification reference signal received power or at least one downlink transmission and reception beam pair identification reference signal received power provided by machine learning.

8. The apparatus of claim 7, wherein the machine learning is configured to determine whether a predicted new serving downlink transmission beam or downlink transmission and reception beam pair will be configured for at least one of a physical uplink shared channel, physical uplink control channel, physical downlink shared channel, or a physical downlink control channel.

9. The apparatus of claim 4, wherein the one of a downlink reception beam pair or a downlink transmission beam pair is from at least one of a downlink reception beam pair observation window or downlink transmission beam pair observation window.

10. The apparatus of claim 1, wherein the reference signal received power measurements are provided between time point t-N and time point t, wherein the identifying that the prediction window is overlapped is performed after time point t, and wherein predicting the beam prediction output is performed after time point t.

11. The apparatus of claim 1, wherein the sequence of beam measurements are associated with sliding windows.

12. The apparatus of claim 1, wherein the at least one non-transitory memory storing instructions that when executed by the at least one processor cause the apparatus at least to:

receive from a communication network information comprising an indication comprising a channel state information reference signal according to overlapped portions of at least one sliding prediction window of time or a concurrent at least one observation window of time.

13. The apparatus of claim 12, wherein the at least one non-transitory memory storing instructions that when executed by the at least one processor cause the apparatus at least to:

perform training and run an inference to obtain a reference signal received power of a set of reference signal received power measurement beam predictions.

14. The apparatus of claim 1, wherein the beam prediction output is based on measuring layer 1 reference signal received power measurements.

15. The apparatus of claim 14, wherein the layer 1 reference signal and assistant information comprising beam identifications, user equipment positions, and a line of sight or non-line of sight indication are used as input to the AI/ML model.

16. The apparatus of claim 1, wherein the sequence of beam measurements is of reference signal received power over time.

17. The apparatus of claim 10, wherein the comparing the beam prediction output with measurements of the observation window during the overlapped portion is performed after time point t using the sequence of beam measurements from the at least one observation window.

18. A method, comprising:

using a sequence of beam measurements including reference signal received power measurements for at least one observation window to predict a beam prediction output for at least one prediction window using an artificial intelligence/machine learning (AI/ML) model, wherein the beam prediction output includes beam identifications or predicted reference signal received power of a subset of beams associated with the beam prediction output;

identifying that a prediction window of the at least one prediction window is overlapped with at least a portion of an observation window of the at least one observation window over a time period; and comparing the beam prediction output during the overlapped portion with measurements of the observation window during the overlapped portion to perform long term real time monitoring to determine at least one of a prediction accuracy of the AI/ML model or a predicted event, wherein the predicted event is based on a predicted reference signal received power of being above a threshold.

19. The method of claim 18, wherein the at least one observation window comprises at least one sliding observation window of identification reference signal received power, and wherein the at least one prediction window comprises at least one sliding prediction window.

20. The method of claim 19, wherein the identifying and comparing is using network configuration information from a communication network comprising a channel state information reference signal associated with the overlapped portion of the observation window.

* * * * *